United States Patent [19]

Kasahara

[11] 3,945,219
[45] Mar. 23, 1976

[54] METHOD OF AND APPARATUS FOR PREVENTING OVERHEATING OF ELECTRICAL MOTORS FOR COMPRESSORS

[75] Inventor: Keisuke Kasahara, Tokyo, Japan

[73] Assignee: Kabushiki Kaisha Maekawa Seisakusho, Tokyo, Japan

[22] Filed: Dec. 9, 1974

[21] Appl. No.: 531,068

Related U.S. Application Data

[63] Continuation of Ser. No. 409,059, Oct. 24, 1973, abandoned, which is a continuation of Ser. No. 171,923, Aug. 16, 1971, abandoned.

[30] Foreign Application Priority Data

Aug. 25, 1970 Japan.............................. 45-74422

[52] U.S. Cl. ...................... 62/469; 62/473; 62/510; 418/97
[51] Int. Cl.² .......................................... F25B 43/02
[58] Field of Search ....... 62/84, 115, 468, 469, 470, 62/473, 510; 418/97, 201

[56] References Cited
UNITED STATES PATENTS

| | | | |
|---|---|---|---|
| 1,717,321 | 6/1929 | Andresen.............................. | 418/97 |
| 2,952,137 | 9/1960 | Watkins............................ | 62/512 X |
| 3,261,172 | 7/1966 | Grant................................ | 62/197 X |
| 3,408,828 | 11/1968 | Soumerai et al...................... | 62/470 |
| 3,432,089 | 3/1969 | Schibbye............................ | 418/201 X |
| 3,568,466 | 3/1971 | Brandin et al. ...................... | 62/510 |
| 3,577,742 | 5/1971 | Kocher............................ | 62/510 X |
| 3,710,590 | 1/1973 | Kocher............................ | 62/470 X |

Primary Examiner—William F. O'Dea
Assistant Examiner—Ronald C. Capossela
Attorney, Agent, or Firm—Stevens, Davis, Miller & Mosher

[57] ABSTRACT

A method of prevention of overheating of an electric motor for a compressor comprising the steps of introducing into the case of the electric motor of the closed type for driving the screw compressor part of the refrigerant which is introduced into an evaporator so as to cause said part of the refrigerant to expand directly therein, and permitting the expanded gas which has absorbed heat to be drawn by suction into a screw blade groove space of the screw compressor in a position in which the screw blades of the screw compressor is meshing engagement with one another have sealed gas.

1 Claim, 2 Drawing Figures

METHOD OF AND APPARATUS FOR PREVENTING OVERHEATING OF ELECTRICAL MOTORS FOR COMPRESSORS

This is a continuation of application Ser. No. 409,059 filed Oct. 24, 1973, now abandoned, which is a continuation of application Ser. No. 171,923, filed Aug. 16, 1971, also now abandoned.

This invention relates to methods of and apparatus for preventing overheating of electric motors for compressors as used in refrigerating machines, and more particularly it is concerned with a method of and an apparatus for preventing overheating wherein part of the refrigerant is caused to expand directly in an electric motor for a screw compressor in order that the heat therein may be absorbed.

Heretofore, the electric motor of a refrigerating machine has been cooled as follows: In the case of an electric motor of the closed type for refrigerating machines, gas of relatively low temperature is permitted to pass through the case of the electric motor before being introduced into the compressor so that the gas may be drawn by suction into the compressor after passing through the electric motor case. This arrangement has a disadvantage in that the gas drawn by suction into the compressor is at an elevated temperature because it absorbs heat in the electric motor case, thereby reducing the ability of the compressor. In the case of an electric motor of the open type for refrigerating machines, a fan is built in the refrigerating machine for effecting cooling of the electric motor case by air, irrespective of whether the drive is a direct drive or belt drive. This arrangement is not without disadvantages either. The fan produces noises; parts surrounding the electric motor case are heated; and the dimension of the electric motor is increased.

This invention obviates the aforementioned disadvantages of the prior art arrangements. The invention has as its object the provision of a method of and an apparatus for preventing overheating wherein a refrigerant is caused to expand directly in an electric motor for a screw compressor to cool the electric motor, and the gas which has absorbed heat is fed into a screw rotor in a position which is posterior to a position in which a gas introduced through a low pressure gas suction port in the screw rotor has been compressed, without the heated gas being introduced into the suction port of the screw compressor.

Additional objects as well as features and advantages of this invention will become evident from the description set forth hereinafter when considered in conjunction with the accompanying drawing, in which.

Figure 1:
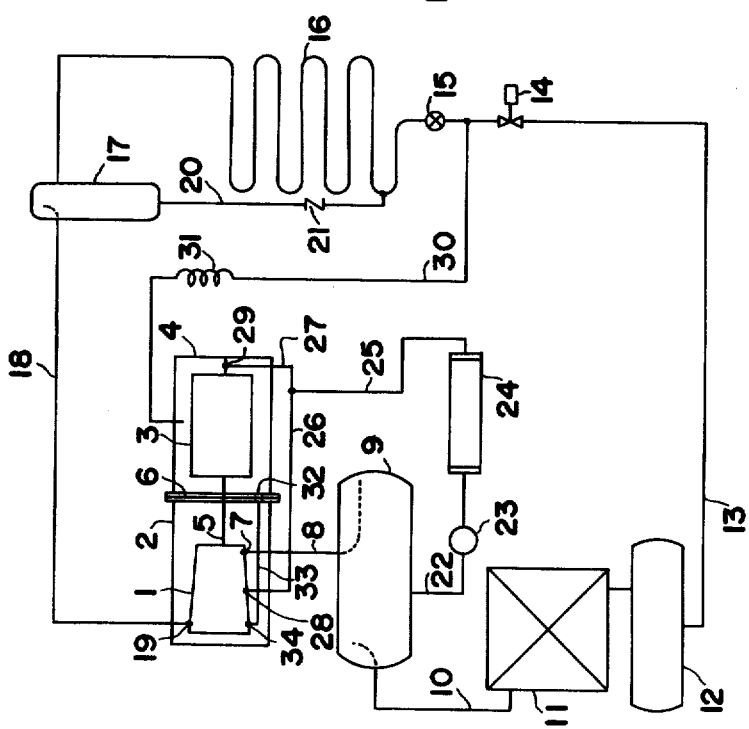
FIG. 1 is a view in explanation of one embodiment of this invention.

FIG. 1 shows a combined compressor of the sealed electric motor type incorporating one embodiment of this invention. 1 is a rotary compressor, such as a screw compressor, for example, 2 a case for providing a seal to the compressor 1, 3 a sealed electric motor, and 4 a case of the motor 3. Compressor 1 and electric motor 3 are directly connected to each other by a rotary shaft 5. Cases 2 and 4 are connected together by a partition wall 6.

An outlet line 8 connected at one end thereof to an outlet port 7 of compressor 1 is connected at the other end thereof to an oil separator 9. A gas line 10 connected at one end thereof to an upper portion of oil separator 10 is connected at the other end thereof to a condenser 11. The condenser 11 is connected to a suction port 19 of compressor 1 through a high pressure receiving vessel 12, liquid outlet line 13, electromagnetic valve 14, expansion valve 15, evaporator 16, liquid separator 17 and low pressure gas suction line 18 arranged in the indicated order.

A liquid return line 20 connected at one end thereof to a lower portion of liquid separator 17 is connected at the other end thereof to evaporator 16, with a check valve 21 being mounted in liquid return line 20. An oil line 22 connected at one end thereof to a lower portion of oil separator 9 is connected at the other end thereof to an oil cooler 24, with an oil pump 23 being mounted in oil line 22. A cooled oil line 25 connected at one end thereof to oil cooler 24 branches off into oil lines 26 and 27 connected to an oil ejection port 28 of compressor 1 and a bearing portion 29 of electric motor 3 respectively, such oil line 26 delivering oil for use with the bearing of the compressor and for ejection and such oil line 27 delivering oil for use with the bearing of the electric motor.

A branch liquid line 30 branching off from liquid outlet line 13 in a position which is posterior to electromagnetic valve 14 is connected to an upper portion of case 4 of electric motor 3, with an expansion valve or throttle valve 31, such as a capillary tube, for example, being mounted in branch liquid line 30.

Formed in partition wall 6 between cases 2 and 4 is a communication opening 32 for permitting gas and oil to pass therethrough which opening 32 is maintained, through a communication line 33 inserted in case 2, in communication with a gas suction port 34 disposed adjacent a screw blade groove space at which gas pressure is higher than at lower pressure gas suction port 19 but lower than at oil ejection port 28 and which is disposed nearer to suction port 19 than ejection port 28.

Operation of the embodiment constructed as aforementioned will now be explained. Refrigerant gas (which in this case is a freon gas for preventing corrosion of electric motor 3) drawn by suction through suction port 19 of compressor 1 is compressed by the screw rotor, mixed with oil ejected through oil ejection port 28 while the gas is being compressed, and discharged through outlet port 7 in the form of a gas-oil mixture after being further compressed. The gas-oil mixture is introduced into oil separator 9 where oil is separated from gas which is introduced into condenser 11 to undergo liquefaction, storage and evaporation successively before being drawn into compressor 1 by suction.

The oil discharged through the bottom of oil separator 9 is introduced into oil cooler 24 by oil pump 23 to be cooled therein. After cooled, the oil passes through cooled oil line 25 to be introduced into oil ejection port 28 of compressor 1 and bearing portion 29 of electric motor 3. After used for lubrication of the motor and the screw rotor, the oil in the compressor is discharged from the compressor through outlet port 7 together with gas. The oil in electric motor 3 passes, after used for lubrication purposes, through opening 32 together with the cooling gas in 4 into communication line 33, from which it is led to gas suction port 34 disposed in a position at which gas pressure is higher than at low pressure gas suction port 19.

The liquid bypassed from liquid outlet line 13 through branch liquid line 30 has its pressure reduced by throttle valve 31 and passes to case 4 of electric motor 3, where the liquid is gasified to absorb heat in electric motor 3. Then, the gas is introduced, together with the oil in case 4, into communication line 33 through opening 32 in partition wall 6, so that it is led to a gear blade groove space in which gas has been compressed by the screw blades of the screw rotor meshing with one another.

The oil in cooled oil line 25 has a pressure head by virture of the high pressure in oil separator 9 which pressure head is sufficiently high to permit ejection of oil into compressor 1 and bearing portion 29 of electric motor 3. Therefore, the provision of oil pump 23 is not necessarily essential.

Figure 2:
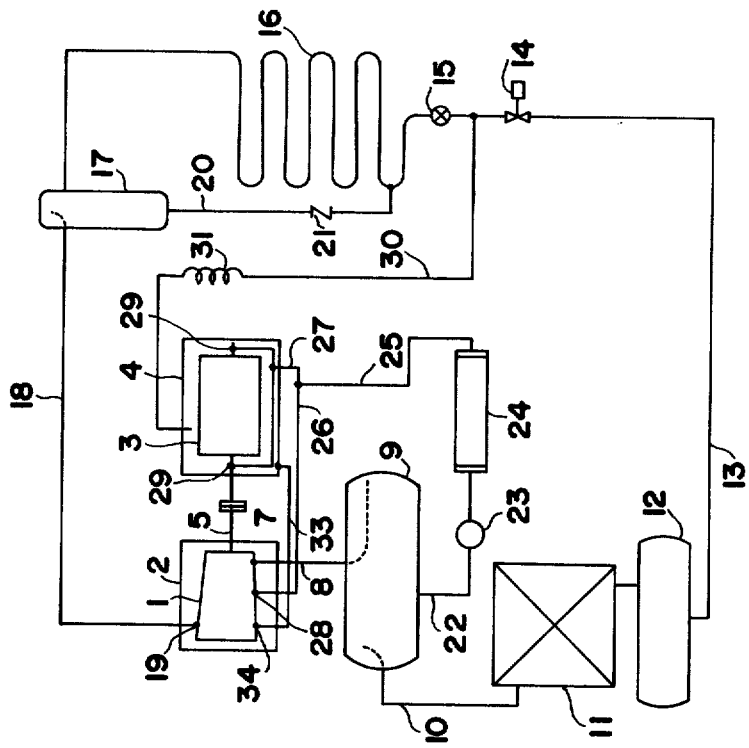
FIG. 2 is a view in explanation of the other embodiment of this invention.

A second embodiment shown in FIG. 2 will now be described. This embodiment is similar to the first embodiment except that case 2 of compressor 1 and case 4 of electric motor 3 are independent of each other, and that communication line 33 extending outwardly of case 4 of electric motor 3 extends into case 2 of compressor 1 so as to be connected to gas suction port 34 of compressor 1 which is nearer to the suction side than oil ejection port 28 thereof.

The second embodiment operates in a manner similar to the manner of operation of first embodiment. The refrigerant evaporated in case 4 of electric motor 3 absorbs heat in case 4 and is led, together with oil, through communication line 33 to gas suction port 34 of compressor 1.

This invention permits introduction into case 4 of electric motor 3, part of the refrigerant which is passed on to evaporator 16, so that part of the gas is caused to expand directly in case 4 by virtue of the arrangements described above. This invention permits cooling the electric motor case more satisfactorily than a conventional method in which the electric motor case is cooled by part of suction gas introduced into compressor 1. Besides, since the gas in casing 4 of electric motor 3 which has absorbed heat is drawn by suction into compressor 1 through gas suction port 34 disposed in a position in which the screw blades of screw compressor 1 have compressed suction gas, there is no fear of reduction of volume efficiency when suction gas is drawn into the compressor. In addition, the fact that suction gas is not overheated makes it unnecessary to provide a fan for cooling electric motor 3, thereby eliminating a potential source of noises.

What is claimed is:

1. A compressor system including apparatus for preventing overheating of an electric motor for a compressor, comprising a rotary screw compressor, an electric motor of the closed type having a rotary shaft connected to a rotary shaft of said screw compressor for driving said compressor, and a sealing case for housing said electric motor, an oil separator connected to an outlet port of said compressor, a condenser, the top portion of which is connected to an upper portion of said oil separator, said condenser also connected to an inlet suction port of said compresser by means including:

a high pressure receiving vessel, an electromagnetic valve, an expansion valve, an evaporator, and a liquid separator, which are respectively connected in series in said order, and a liquid return line including a check valve connected between said liquid separator and said evaporator;

a first oil return line including an oil pump and an oil cooler, connecting said oil separator and said motor, a second oil return line connecting an oil ejection port of said compressor with said first oil return line at a point downstream of said oil pump and oil cooler, a branch liquid line connected downstream from said electromagnetic valve and upstream of said expansion valve, said line including a throttle valve, and connected to an upper portion of the sealing case for said motor, and means connecting the downstream end of said motor case with a second gas suction port of said compressor, said second gas suction port located in a gear blade groove space of said screw compressor at a position where the screw blades of said compressor in meshing engagement with one another have at least partially compressed gas entering said screw compressor through said inlet suction port.

* * * * *